United States Patent Office 3,468,903
Patented Sept. 23, 1969

3,468,903
DINITROIMIDAZOLIDIN-2-ONE DERIVATIVES
Andrew Cochran Currie, Largs, and Andrew Harper Dinwoodie, Dalry, Scotland, assignors, by mesne assignments, to the United States of America as represented by the Secretary of the Navy
No Drawing. Filed Dec. 12, 1966, Ser. No. 600,728
Claims priority, application Great Britain, Feb. 28, 1966, 8,765/66
Int. Cl. C07d 49/00, 49/34
U.S. Cl. 260—309.7   5 Claims

ABSTRACT OF THE DISCLOSURE

New organic nitrogen compounds which are 4,5-dihydroxy, -dimethoxy, -diethoxy and -diacetoxy-1, 3-dinitroimidazolidin-2-ones. The compounds are propellants. They may be prepared by a process in which the starting material is a 4,5-dihydroxy, -dimethoxy, or -diethoxy-1, 3-imidazolidin-2-one or -2-nitriminoimidazolidine and is treated with nitric acid or a mixture of nitric acid and acetic anhydride at a temperature in the range of from $-10°$ C. to $20°$ C.

---

This invention relates to novel compounds which may be classified broadly as 1,3-dinitro derivatives of 4,5-disubstituted imidazolidin-2-one, and to the preparation of these compounds.

The new compounds of the invention have the structural formula

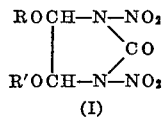

(I)

wherein R and R', which may be the same or different, each represent a monovalent atom or group and may, for example, be an alkyl, substituted alkyl, aryl, substituted aryl, acyl, or aroyl group.

These compounds are useful energetic constituents of propellant explosive compositions.

In accordance with the invention, compounds of Formula I are prepared by treating 4,5-dihydroxyimidazolidin-2-one or a 4,5-diether or a 4,5-diester thereof with a nitrating agent. The reaction may be represented as

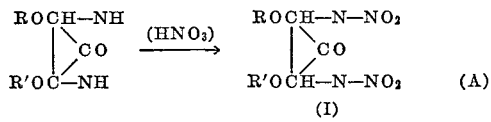

where R and R' have the meanings given above and may also be hydrogen.

In accordance with a further aspect of the invention, compounds of Formula I may be prepared by nitration of 4,5-dihydroxy-2-nitriminoimidazolidine or a 4,5-diether or a 4,5-diester thereof. The reaction may be represented as

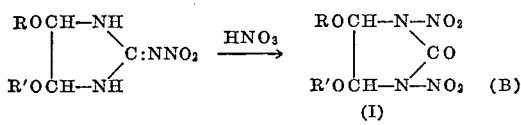

where R and R' have the meanings given above, and may also be hydrogen.

The imidazolidine derivative used as the starting material in reaction (B) may be prepared as described in our co-pending application Ser. No. 600,381, filed Dec. 9, 1966.

In the preparation of the compounds of the invention the starting material may conveniently be treated at atmospheric pressure with a nitrating agent at a temperature in the range $-10°$ to $+20°$ C. Nitric acid is a convenient nitrating agent either alone or in admixture with acetic anhydride. The products of the reaction may conveniently be isolated by pouring the reaction mixture onto ice and filtering off the resultant precipitate by the extraction of the resultant aqueous solution with an organic solvent such as, for example, chloroform or di-ethyl ether, or by evaporation at room temperature.

The invention is further illustrated by the following examples in which all parts and percentages are by weight.

EXAMPLE 1

9 parts of 99–100% nitric acid were added slowly with vigorous stirring to a suspension of 1 part of 4,5-dimethoxyimidazolidin-2-one in 3.2 parts of acetic anhydride at 0° C. After stirring for 2 hours at 0° C., the mixture was poured onto 100 parts of ice and the resultant precipitate filtered off, dried and recrystallised from diethyl ether to give 1 part (62% of theory) of a colourless, crystalline solid product, melting at 120–121° C., which was identified as 4,5-dimethoxy-1,3-dinitroimidazolidin-2-one. The solid product was found by elemental analysis to contain 25.4% carbon, 3.4% hydrogen and 25.2% nitrogen. 4,5-dimethoxy-1,3-dinitroimidazolidin-2-one, $C_5H_8N_4O_7$, requires 25.4% carbon, 3.4% hydrogen and 23.7% nitrogen. The infrared spectrum of the product showed strong absorptions at 5.56 and 6.33$\mu$, due to the carbonyl and nitramine groups, respectively.

This compound did not explode when heated at 5° C. per minute to 240° C., nor when struck with a ½ kg. mild steel hammer falling from a height of 200 cm. onto a thin layer of the compound on a mild steel anvil. It burned vigorously when ignited.

EXAMPLE 2

2.0 parts of 4,5-dihydroxyimidazolidin-2-one was added slowly with stirring to 10.8 parts of 100% $HNO_3$ cooled to 0° C. and the solution left at 20° C. for three days. The excess of nitric acid was allowed to evaporate in a stream of dry air and a crystalline solid was obtained. This solid was washed with petroleum ether and dried under vacuum at room temperature to give 0.8 part of 4,5-dihydroxy-1,3-dinitrimidazolidin-2-one. On heating, this compound melted with decomposition at 158° C. It was found by elemental analysis to contain 17.3% carbon, 1.8% hydrogen and 26.2% nitrogen. 4,5-dihydroxy-1,3-dinitroimidazolidin-2-one, $C_3H_4N_4O_7$, requires 17.3% carbon, 1.9% hydrogen and 26.9% nitrogen.

The infrared spectrum showed absorptions at 2.95$\mu$ due to hydroxyl groups and 5.6 and 6.3$\mu$ due to nitramine groups.

EXAMPLE 3

1.8 parts of 4,5-diethoxyimidazolidin-2-one were added slowly with stirring to a mixture of 32.4 parts acetic anhydride and 17 parts of 99–100% nitric acid at 0° C. After standing for one hour at room temperature the mixture was poured over 100 parts of ice. Extraction of this diluted reaction mixture with 200 parts of chloroform gave 1.2 parts (44% of theory) of crude 4,5-diethoxy-1,3-dinitroimidazolidin-2-one as a clear oil which burned rapidly. Gas-liquid chromatography showed this oil to be approximately 95% pure. Elemental analysis gave 34.5% carbon, 5.4% hydrogen and 19.5% nitrogen. 4,5-diethoxy-1,3-dinitroimidazolidin-2-one, $C_7H_{12}N_4O_7$, requires 31.8% carbon, 4.5% hydrogen and 21.2% nitrogen. The infra-red spectrum of the oil showed a strong absorption at 6.25$\mu$, due to the nitramine groups.

EXAMPLE 4

9 parts of 99–100% nitric acid were added slowly with vigorous stirring to a suspension of 1 part of 4,5-dimethoxy-2-nitriminoimidazolidine in 3.2 parts of acetic anhydride at 0° C. After stirring for 2 hours at 0° C., the mixture was poured on to 100 parts of ice and the resultant precipitate filtered off, dried and recrystallised from diethyl ether to give 1 part (80% of theory) of a colourless crystalline solid which melted at 120–121° C., and was identical to the 4,5-dimethoxy-1,3-dinitroimidazolidin-2-one produced in Example 1.

EXAMPLE 5

9 parts of 99–100% nitric acid were added slowly with vigorous stirring to a suspension of 1 part of 4,5-dihydroxy-2-nitriminoimidazolidine in 3.2 parts of acetic anhydride at 0° C. After stirring for 2 hours at 0° C., the mixture was poured on to 100 parts of ice, filtered and dried to give 1 part (55% of theory) of crude hygroscopic material. This was then washed with 30 parts ethanol and dried to give 0.75 part of a solid compound melting with decomposition at 125–8° C., which was shown to be 4,5-diacetoxy-1,3-dinitroimidazolidin-2-one. Elemental analysis of this compound showed it to contain 28.8% carbon, 2.2% hydrogen and 19.2% nitrogen. 4,5-diacetoxy-1,3-dinitroimidazolidin-2-one, $C_7H_8N_4O_9$, requires 28.8% carbon, 2.7% hydrogen and 19.2% nitrogen.

The infra-red spectrum of 4,5-diacetoxy-1,3-dinitroimidazolidin-2-one shows strong absorptions at 5.5, 5.7 and 6.25μ due to the imidazolidin-2-one carbonyl-, the acetyl carbonyl- and the nitramine group, respectively.

EXAMPLE 6

1 part of 4,5-dihydroxyimidazolidin-2-one was treated with 9 parts of 99–100% nitric acid and 3.2 parts of acetic anhydride at 0° C. as described in Example 5 and 0.8 part of 4,5-diacetoxy-1,3-dinitroimidazolidin-2-one were produced and identified by their infra-red spectrum.

What we claim is:
1. An organic nitrogen compound of the formula:

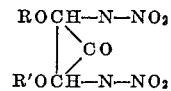

wherein R and R' are the same and a member of the group consisting of hydrogen, methyl, ethyl and acetyl radicals.
2. 4,5-dihydroxy-1,3-dinitroimidazolidin-2-one.
3. 4,5-dimethoxy-1,3-dinitroimidazolidin-2-one.
4. 4,5-diethoxy-1,3-dinitroimidazolidin-2-one.
5. 4,5-diacetoxy-1,3-dinitroimidazolidin-2-one.

References Cited

UNITED STATES PATENTS 2,400,288    5/1946    Caesar et al. _____ 260—309.7

OTHER REFERENCES

Franchimont et al.: Rec. Trav. Chim. Pays-Bas vol. 7. Pages 16–18 and 243–6 relied on (1888).

Groggins Unit Processes in Organic Synthesis 2nd ed. p. 1 N.Y., McGraw-Hill, 1938.

McKay et al.: Jour. Org. Chem. vol. 22, pp. 1581–3 (1957).

HENRY R. JILES, Primary Examiner

N. TROUSOF, Assistant Examiner

U.S. Cl. X.R.

149—92